May 6, 1958 L. G. BRAUNSTEIN 2,833,177
NEGATIVE HOLDER AND CUTTER
Filed March 28, 1955 2 Sheets-Sheet 1

INVENTOR.
LEE G. BRAUNSTEEN
BY
Arthur H. Seidel

May 6, 1958 — L. G. BRAUNSTEIN — 2,833,177
NEGATIVE HOLDER AND CUTTER
Filed March 28, 1955 — 2 Sheets-Sheet 2
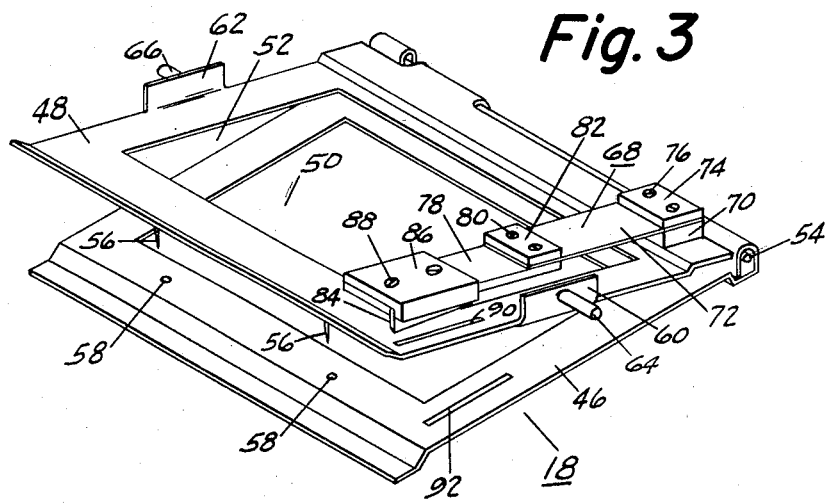
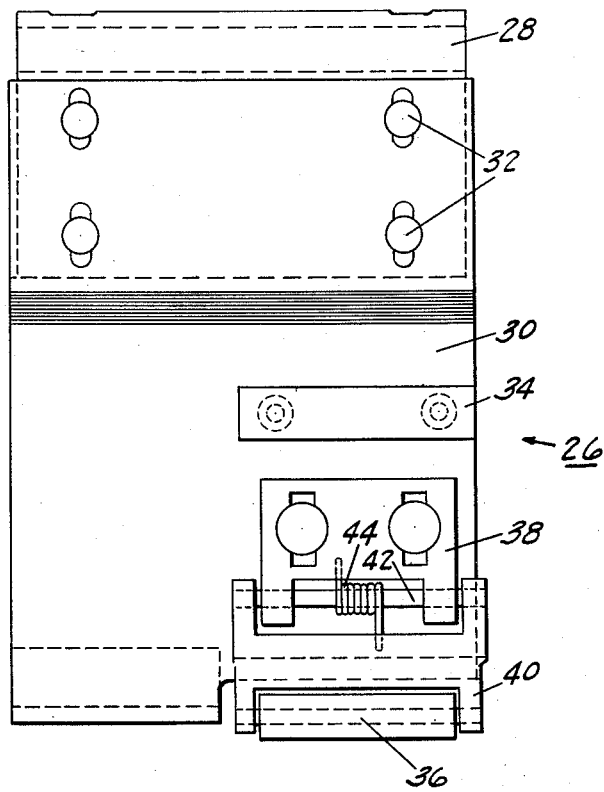
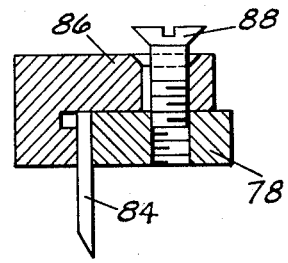
INVENTOR.
LEE G. BRAUNSTEIN
BY Arthur H. Seidel
ATTORNEY

United States Patent Office 2,833,177
Patented May 6, 1958

2,833,177

NEGATIVE HOLDER AND CUTTER

Lee G. Braunstein, Philadelphia, Pa.

Application March 28, 1955, Serial No. 497,259

1 Claim. (Cl. 88—24)

The present invention relates to a negative holder-and-cutter for projection printers and to an improved projection printer, wherein the unexposed areas intermediate exposed negative frames are notched or cut.

The cutting of negative film strips has long been a serious problem in the photofinishing industry. Due to the physical properties of negative film materials, such as cellulose acetate or cellulose nitrate, negative film strips are prone to scratching unless manipulated under closely controlled conditions. The static electricity properties of the aforesaid negative film materials lead to stickiness and markedly interfere with the handling of the film. Furthermore, the unexposed spacing areas intermediate exposed negative frames are never perfectly spaced due to human errors in winding the film in the camera when in use, rendering any cutter operating at predetermined space intervals of no value.

An object of the present invention is to provide a negative holder for a projection printer which cuts the unexposed area intermediate exposed negative frames.

Another object of the present invention is to provide a projection printer in which the unexposed area intermediate negative frames is cut without interference with the printing operation of the printer.

A further object of the present invention is the provision of a cutter for strips of negative film which does not mar or scratch the film strip.

For the purpose of illustrating the invention there is shown in the drawings a form which is presently preferred; it being understood, however, that this invention is not limited to the precise arrangements and instrumentalities shown.

Figure 3 is a perspective view of the negative holder of the present invention.

Figure 4 is an elevational view of the knife actuator of the present invention.

Figure 5 is an enlarged fragmentary section through a portion of the knife-clamp and cutting knife blade of the present invention.

Figure 1:
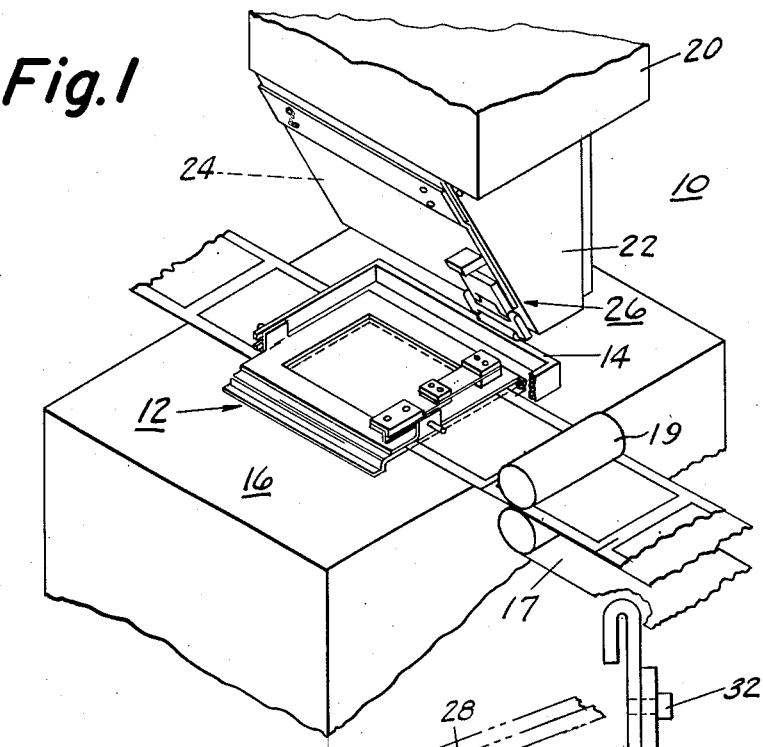
Figure 1 is a perspective elevational view of a projection strip-paper printer of the present invention.

Referring to the drawings, and initially to Figure 1, the projection printer of the present invention may be of the enlarging printer type and is designated 10. The projection printer 10 comprises film holder portion 12 comprising a yoke 14 having slotted arm tips, and a film gate top 16 on which negative holder 18 is mounted. A conveyor belt 17, which operates intermittently after passage of light through the negative, and an idler wheel 19, preferably of a non-abrasive material such as Teflon (a polymerized tetrafluoroethylene resin made by E. I. du Pont de Nemours of Wilmington, Delaware) are mounted to one side of negative holder 18 for conveying notched or cut negatives from printer 10.

Below film holder portion 12 is a light source arranged to project a beam of light through an exposed negative frame of a negative film strip being passed through negative holder 18.

Spaced above negative holder 18 is sensitized paper housing 20 of conventional design in which the positive printing paper is exposed.

Intermediate paper housing 20 and negative holder 18 is a pivotable hood 22 through which the light passing through an exposed negative frame retained in operative position in negative holder 18 passes when the hood 22 is in its operative position.

Hood 22 is operatively aligned intermediate housing 20 and negative holder 18 when light is passed through the negative holder 18 and is pivoted to a raised position when not in use.

Attached to the forward face 24 of pivoted hood 22 is knife actuator 26 comprising an upper angular clamping plate 28, which fits over the upper edge of hood 22, and a lower angular clamping plate 30 which fits on the lower edge of pivoted hood 22. Plates 28 and 30 are joined together by bolts 32.

A safety lug or post 34 is rigidly secured onto lower angular clamping plate 30 at approximately the middle portion of knife actuator 26.

Roller 36 is spaced beneath safety lug 34 and is pivotally suspended from roller mount 38, which is fixedly secured to plate 30. Thus, roller 36 is carried on an H-shaped roller carrier 40, which is pivotally suspended on pivot bar 42 from roller mount 38.

Retention spring 44 urges roller carrier 40 against clamping plate 30.

The negative holder 18 of the present invention comprises lower and upper rectangular gate members 46 and 48 formed with registering apertures 50 and 52 respectively. Apertures 50 and 52 coincide with the area of each exposed frame on a negative film strip to be used in printer 10.

Gate members 46 and 48 are hingedly connected along their rear edge by hinge 54. Positioning pins 56 on gate member 48 are spaced so that when the gate members 46 and 48 are closed, e. g. gate members 46 and 48 are brought together, pins 56 will extend into registering holes 58 in gate member 46.

Upper gate member 48 is provided with upturned ears 60 and 62 along its sides, which ears 60 and 62 carry trunnions 64 and 66. Trunnions 64 and 66 are constructed and arranged to be received in the slotted arm tips of yoke 14, so that negative holder 18 may be operatively positioned in place.

Upper gate member 48 is provided with a negative cutting knife designated generally as 68.

Knife 68 comprises a spacer block 70 on which is mounted spring hinge 72 and nut plate 74, with block 70, hinge 72 and plate 74 fixedly secured together, and to the rear portion of upper gate member 48, by screws 76. Blade-holder plate 78 is carried at the end of spring hinge 72 opposite spacer block 70 with screws 80 joining blade-holder plate 78, spring hinge 72 and nut plate 82 together.

Knife blade 84 is retained between angled clamp plate 86 and blade-holder plate 78. This may be accomplished by counter-sinking oversize threaded openings for screws 88 in clamp plate 86 offset from the threaded screw openings for screws 88 in plate 78. The tilted screw head angle of screws 88 in clamp plate 86 with the body of the screws threadably received in plate 78 permits tightening of screws 88 to force clamp plate 86 against knife blade 84, rigidly clamping knife blade 84 into position.

Gate member 48 is provided with knife slot 90, in registry with knife blade 84, through which knife blade 84 is received. Spring hinge 72 normally urges knife blade 84 to a position without knife slot 90 so that only the exertion of a positive force on the upper surface of clamp plate 86 will urge knife blade 84 through knife slot 90.

Lower gate member 46 is provided with a knife slot 92 which is in alignment with knife slot 90 when gate members 46 and 48 are operatively positioned.

While knife blade 84, knife slots 90 and 92 are illustrated as extending across the width of apertures 50 and 52 for but a portion of such width, it is, of course, to be understood that knife blade 84, and knife slots 90 and 92 may extend for the full width of apertures 50 and 52 so that a cut across the entire width of a negative having an exposed frame aligned with apertures 50 and 52 may be effected; rather than merely notching the negative for but a fraction of its width.

Where negatives are cut across their entire width conveyor belt 17 is preferably tilted in respect to the horizontal so that the cut frames may be conveyed away from printer 10 and stacker. Conveyor belt 17 aids in the separation of cut negative frames.

Figure 2:
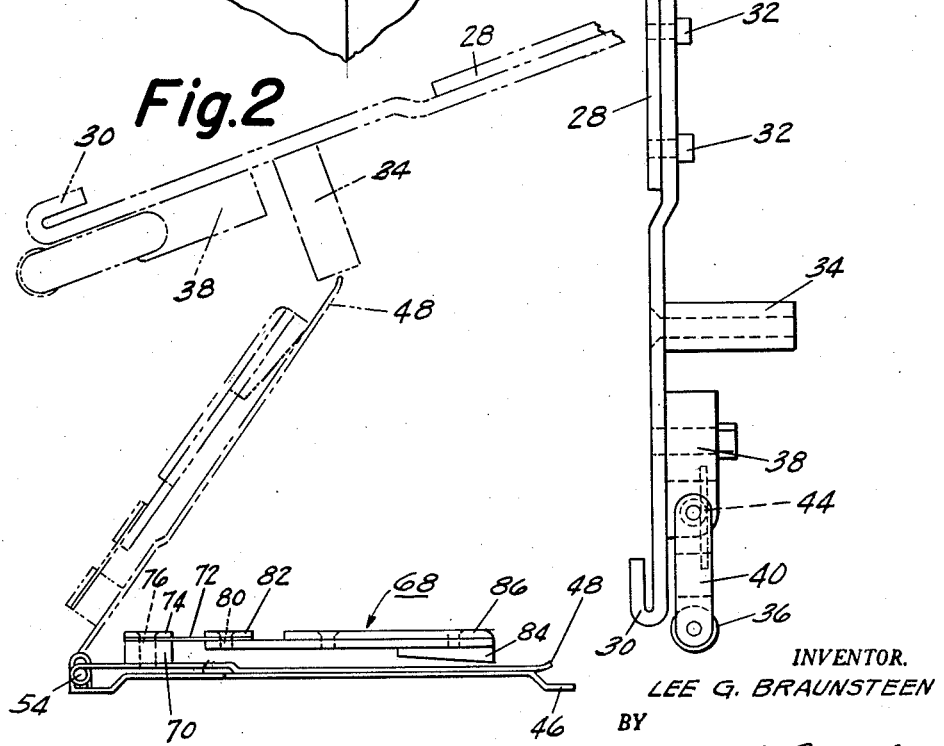
Figure 2 is a side elevational view of the negative holder and knife actuator of the present invention.

The operation of the printer and negative holder-and-cutter of the present invention is as follows:

A negative strip is passed through negative holder 18 and an exposed frame thereof aligned with aperture 50 in gate member 46. Prior to the alignment of the exposed frame pivoted hood 22 is angularly positioned in respect to the negative holder 18 (see left view in Figure 2).

When the operator has aligned the exposed frame of the negative strip with apertures 50 and 52 (gate member 48 being superposed in operative position over gate member 46, with positioning pins 56 received in holes 58), the operator moves hood 22 to its operative position. The pivotation of hood 22 causes roller 36 to pass over and press down on the upper surface of clamp plate 86, lowering knife blade 84 into knife slots 90 and 92, and notching the unexposed spacing area of the negative adjacent to the exposed frame. Roller 36 has a sufficient width so that it can be utilized on any size negative holder; the size of the negative holders being varied to compensate for different film widths.

The notching of the negative film strip in the unexposed area intermediate exposed frames provides a signal whereby an automatic film cutter, such as that described in copending application for United States Letters Patent Serial No. 497,336, in the name of myself and Frederick W. Kulicke, Jr., filed on even date herewith, may effect a cut across the width of the negative on a line with such signal.

After the notching of the film has been effected, hood 22 is in its operative position in respect to the exposed frame and light is passed therethrough and received on sensitized paper in sensitized paper housing 20. It is to be noted that the notching is effected prior to the passage of light to the sensitized paper, and that there is no force or vibration transmitted to the negative during the passage of light therethrough.

When the positive has been exposed, hood 22 is pivotedly passed back to its raised inoperative position. Roller 36 is pressed away from lower angular clamping plate 30 and against spring 44 during this passage by contact with clamp plate 86; roller carrier 40 being pivoted about pivot bar 42 until roller 36 clears clamp plate 86. When roller 36 clears clamp plate 86, spring 44 urges roller carrier 40 towards clamping plate 30 and it resumes its normal position.

When gate member 48 is raised from gate member 46 the knife blade 84 remains outside of slot 90, and the possibility of the operator cutting himself on knife blade 84 is obviated. The pivotation in raised position of gate member 48 against knife actuator 26 cannot result in the passage of knife blade 84 through slot 90, as gate member 48 will engage safety lug 34 prior to the contact of clamp plate 86 with any part of the knife actuator 26, and prevent the contact of clamp plate 86 with knife actuator 26.

Conveyor belt 17 may be operated in alignment with an automatic film cutter, such as that described in copending application for United States Letters Patent Serial No. 497,336, filed on even date, so that the web of notched negatives may be conveyed from holder 18 to the automatic film cutter.

The present invention may be embodied in other specific forms without departing from the spirit or essential attributes thereof and, accordingly, reference should be made to the appended claim, rather than to the foregoing specification as indicating the scope of the invention.

I claim:

In a photographic printer for preparing positives from a strip of spaced negatives the improvement which comprises a negative holder including a pair of film gates hingedly connected together along one edge of each film gate, each of said film gates having a relatively large centrally positioned image-area aperture and a relatively small slot spaced from and at one side of the image-area aperture, said apertures and slots being aligned when the film gates are juxtaposed in operative negative holding disposition, cutting means spring-hingedly mounted upon the outer surface of the uppermost of said film gates, said cutting means being in registry with the slot of the film gate on which the cutting means is mounted, and an actuator for said cutting means mounted above said cutting means, said actuator comprising a hood through which light may be transmitted to the image-area aperture, said actuator being movable between a plurality of positions, one of said positions comprising the position in which light is transmitted to the image-area aperture and the other of said positions being a position in which said actuator engages said cutting means when the film gates are juxtaposed in respect to each other in operative negative holding disposition and urges said cutting means through the slot in at least the uppermost film gate.

References Cited in the file of this patent

UNITED STATES PATENTS

| 70,033 | Shopbell | Oct. 22, 1867 |
| 197,326 | Brownson | Nov. 20, 1877 |
| 2,207,024 | Prince | July 9, 1940 |
| 2,293,264 | Leslie | Aug. 18, 1942 |
| 2,315,452 | Pifer | Mar. 30, 1943 |
| 2,395,082 | Wilson | Feb. 19, 1946 |

FOREIGN PATENTS

| 612,746 | France | Aug. 7, 1926 |